United States Patent [19]

Agarwal et al.

[11] Patent Number: 4,713,754

[45] Date of Patent: Dec. 15, 1987

[54] DATA STRUCTURE FOR A DOCUMENT PROCESSING SYSTEM

[75] Inventors: Arun K. Agarwal, Chelmsford; Suzanne C. Knapp, Lowell; David R. Lakness, Chelmsford, all of Mass.

[73] Assignee: Wang Laboratories, Inc., Lowell, Mass.

[21] Appl. No.: 658,952

[22] Filed: Oct. 9, 1984

[51] Int. Cl.[4] .............................. G06F 15/40; G06F 7; G06F 00; G06F 12/00

[52] U.S. Cl. ..................................... 364/200; 364/300

[58] Field of Search ... 364/200 MS File, 900 MS File, 364/300 MS File

[56] References Cited

U.S. PATENT DOCUMENTS

| | | | |
|---|---|---|---|
| 4,068,300 | 1/1978 | Bachman | 364/200 |
| 4,408,181 | 10/1983 | Nakayama | 364/900 |
| 4,454,576 | 6/1984 | McInroy et al. | 364/200 |
| 4,464,730 | 9/1984 | Lawrence et al. | 364/900 |
| 4,503,515 | 3/1985 | Cuan et al. | 364/900 |
| 4,513,391 | 4/1985 | Maddock | 364/900 |
| 4,539,653 | 9/1985 | Barlett et al. | 364/900 |
| 4,553,206 | 11/1985 | Smutek et al. | 364/300 |
| 4,553,860 | 11/1985 | Imaizumi et al. | 364/900 |
| 4,633,430 | 12/1986 | Cooper | 364/900 |

Primary Examiner—Raulfe B. Zache
Assistant Examiner—William G. Niessen
Attorney, Agent, or Firm—Michael H. Shanahan

[57] ABSTRACT

A data structure for use in a document processing system corresponds to a document comprised of one or more Pages. Each Page is subdivided into one or more nonoverlapping Areas, each Area in turn being comprised of one or more types of Layers. Each Layer type is expressive of a particular type of information such as text or graphics information. Different Layer types may be superimposed to comprise the contents of an Area.

12 Claims, 13 Drawing Figures

DATA STRUCTURE FOR A DOCUMENT PROCESSING SYSTEM

CROSS REFERENCE TO RELATED APPLICATIONS

The present patent application is related to the following U.S. patent applications, also assigned to the assignee of the present patent application: U.S. patent application Ser. No. 655,280 filed Sept. 27, 1984 and U.S. patent applications Ser. Nos. 658,951, 658,953, 659,192 and 659,203, all filed on Oct. 9, 1984.

BACKGROUND OF THE INVENTION

1. Field Of The Invention

The present invention related to a data processing system and, in particular, a system particularly designed for the processing of data in document form.

2. Prior Art

Data processing systems of the prior art have generally fallen into one of two classes, the first being general purpose systems designed to perform a wide variety of tasks and the second being specialized systems optimized for a limited range of related tasks.

A recurring problem with the first class of data processing systems is that many such systems, while having a wide range of applications, may not be as efficient for certain tasks as more specialized system. The second class of systems, however, are generally not easily expandable for tasks other than those for which they were originally designed, even when the additional tasks may be related to the original tasks.

SUMMARY OF THE INVENTION

The present invention provides a solution to the above described problems of the prior art, and other problems. by providing a data processing system with features which allows the system to efficiently perform relatively specialized. related tasks, such as document processing. while being readily expandable for other tasks.

In the present embodiment, the system incorporates a task control means including a task loader for transferring tasks from a storage means to a system memory means and a task manager responsive to operation of the system for controlling execution of tasks, and a document manager for loading document information in the form of document data structures from the storage means to the system memory and managing access to the document data structures by the tasks. The task manager incorporates task control blocks, which are used to manage the execution of tasks, while the document manager incorporates document control blocks which are used to manage access to the document data structures by the tasks.

There is a task control block for each active task in the system, and each task control block includes an identification field for storing information identifying the corresponding task, a status field for storing information identifying the status of execution of the corresponding task, a priority field for storing information identifying the relative priority of execution of the corresponding task, and a stack pointer field for storing information identifying the location of a stack mechanism usable by the corresponding task. The task control blocks reside in a task manager queue mechanism, with the task control blocks being linked by pointers in the preferred sequence of their execution.

There is a document control block for each document data file in the system and the document files and document control blocks are designed to represent and relate to the structure of documents. Each document file includes at least one page, and each page including at least one area, wherein each area contains at least one type of information. Each area including, in an area containing text information, at least one column for containing text information. Each column including at least one line, and each line including a string of at least one text character, a reference to attributes applying to the characters of the string, and references to external data items associated with the line.

The document file structure includes, for each document file, at least one page block, each page block comprising fields describing the logical dimensions of the page, fields describing the position of a cursor on the page, the cursor position indication the logical position within the data contained in the page of an operation being performed on the data, a field indicating cursor type, a field describing page layout, and field containing a pointer to an area block. Each file structure includes at least one area block, each area block comprising a field for containing a pointer to a next area, fields containing information defining the type of area, fields defining the logical position of the area with the page, fields defining the margins of the area, fields defining the position of text appearing in the area, fields defining the relationship of the area to other areas of the page, and a field for a pointer to a column block. The structure further includes at least one column block, comprising a field identifying the format of the text appearing in the area, and at least one field for a pointer to a line block. The structure includes at least one line block, each line block comprising at least one field containing a string of at least one text character, a reference to attributes applying to the characters of the string, and references to external data items associated with the line.

The system also includes a screen manager for creating visual display screens representing data, generally residing in the document structures described above. The screen manager includes means responsive to active tasks for creating a screen manager control structure containing information relating each screen to a corresponding task, and, for each screen, information describing certain properties of the screen, and information relating the screen to the data residing in the document structure to be to be displayed therein. The screen manager also includes means responsive to the corresponding tasks and corresponding screen manager control structures to access and display the corresponding data.

Each screen is described, in the screen manager control structure. by a virtual screen descriptor block and includes at least one viewport onto a portion of the data structure being operated upon by an associated task. Each virtual screen descriptor block includes a field identifying the associated screen, a field identifying the associated task, fields describing the associated screen, a field containing a pointer to a first viewport associated with the screen, a field containing an array of numbers identifying all viewports associated with the screen, and a field for containing a pointer to a next virtual screen descriptor block associated with a screen.

Each viewport is described by a viewport descriptor block including a field containing a pointer to a page containing the data to be displayed within the viewport, fields describing the logical location and dimensions of the viewport relative to the data to be displayed therein, fields describing the location of a cursor within the viewport, the position of the viewport being associated with the operation of the associated task upon the data, and field for containing a pointer to a next viewport descriptor block of a viewport associated with the screen.

Other advantages and features of the present invention will be understood by those of ordinary skill in the art after referring to the following detailed description of preferred embodiment and drawings, wherein:

DESCRIPTION OF A PREFERRED EMBODIMENT

The following description presents the structure and operation of a data processing system incorporating the present invention. The structure and operation of the system will be first presented on an overall level, followed by descriptions of certain aspects of the system on a more detailed level. Finally, further detailed information and descriptions of certain of the system functions and structures will be presented in the form of appendices.

Before beginning the descriptions of the system, it should be noted that the reference numbering system used herein is constructed to clarify the following descriptions in the manner in which the references appearing in the text are related to the drawings and the elements shown therein. Each reference number is comprised of either three or four digits, wherein the two rightmost digits refer to a specific element appearing in a drawing and the one or two left digits refer to the figure in which the element first appears. For example, the reference 303 refers to the 3rd element first appearing in FIG. 3, while the reference 1033 would refer to the 33rd element first appearing in FIG. 10. Once a reference number has been assigned to an element, that reference number will be used throughout the following portions of the descriptions, including the following figures.

Figure 10A:
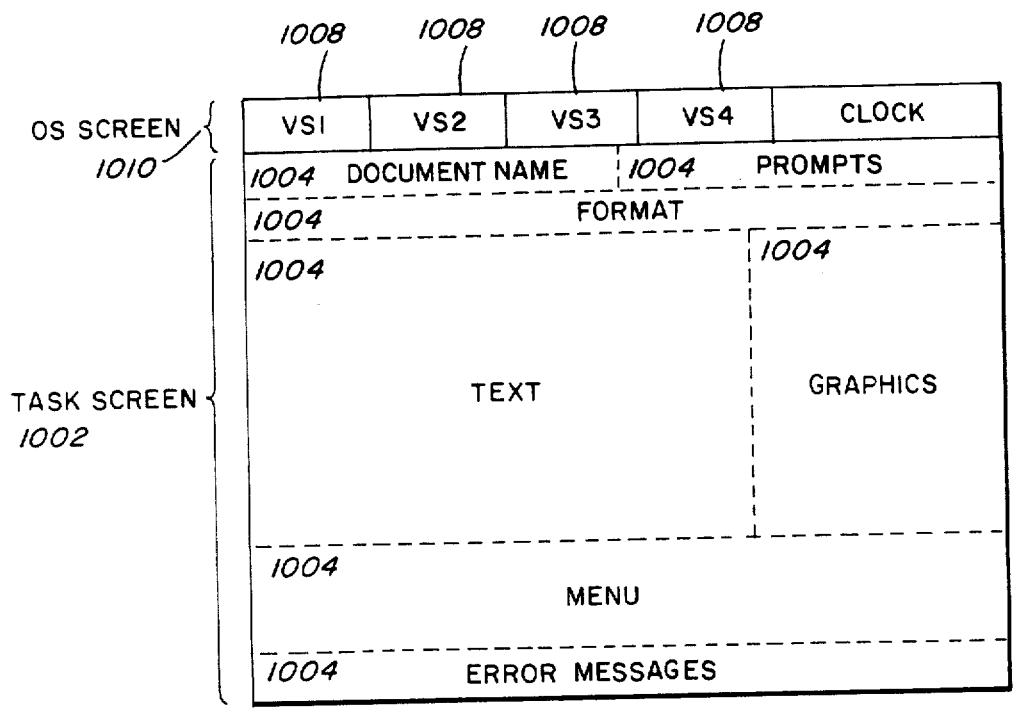
FIGS. 10A and 10B are a diagrammic illustration of a display generated by the screen manager of the system of FIG. 1.
Figure 10B:
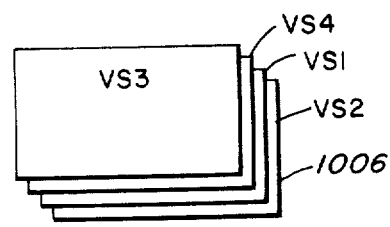
Figure 11:
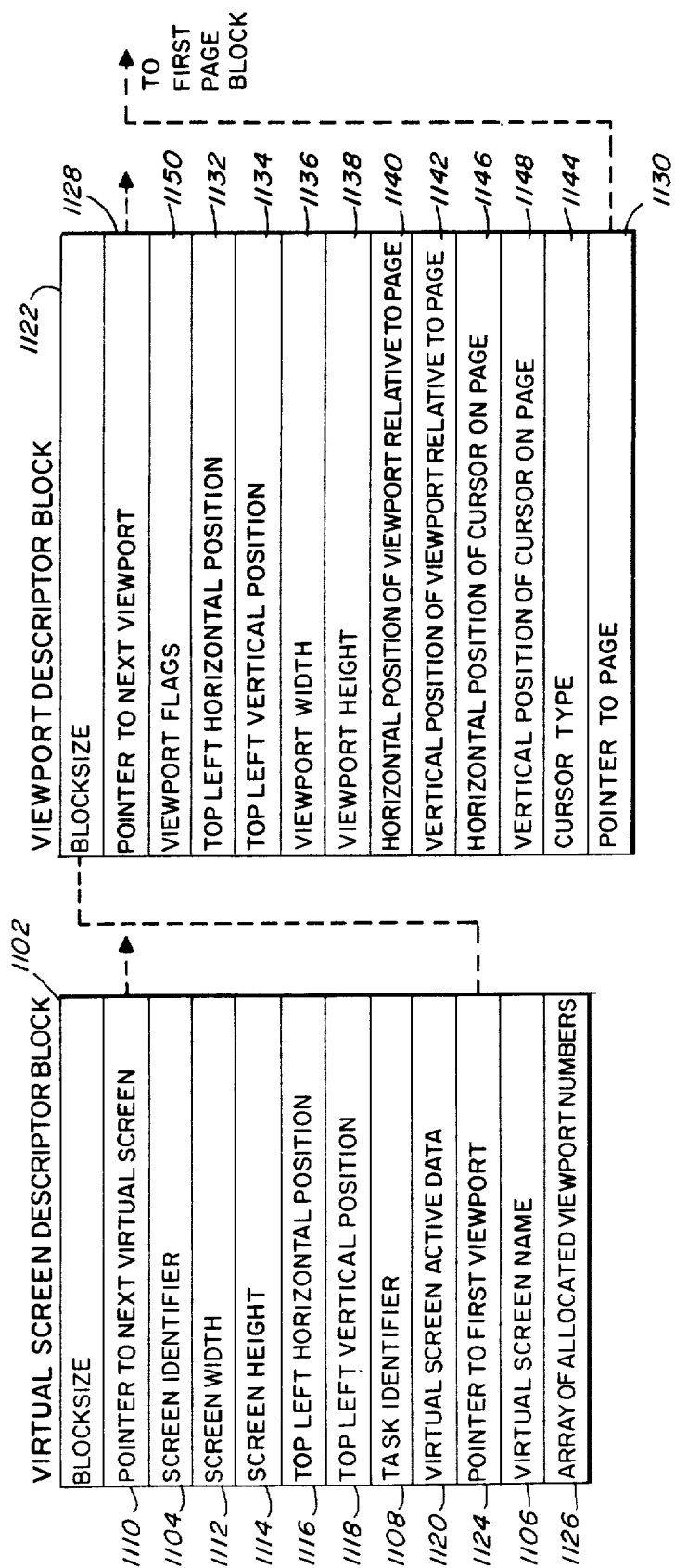
FIG. 11 is a diagrammic representation of the screen manager data structure; and, FIG. 12 is a diagrammic representation of the operation of the screen manager of the system of FIG. 1.

For example, element 1033 first appears in FIG. 10 and, if it also appears in FIG. 11, will be indicated in FIG. 11 by the reference 1033.

1. Overall System Structure and Operation (FIGS. 1 and 2)

Figure 1:
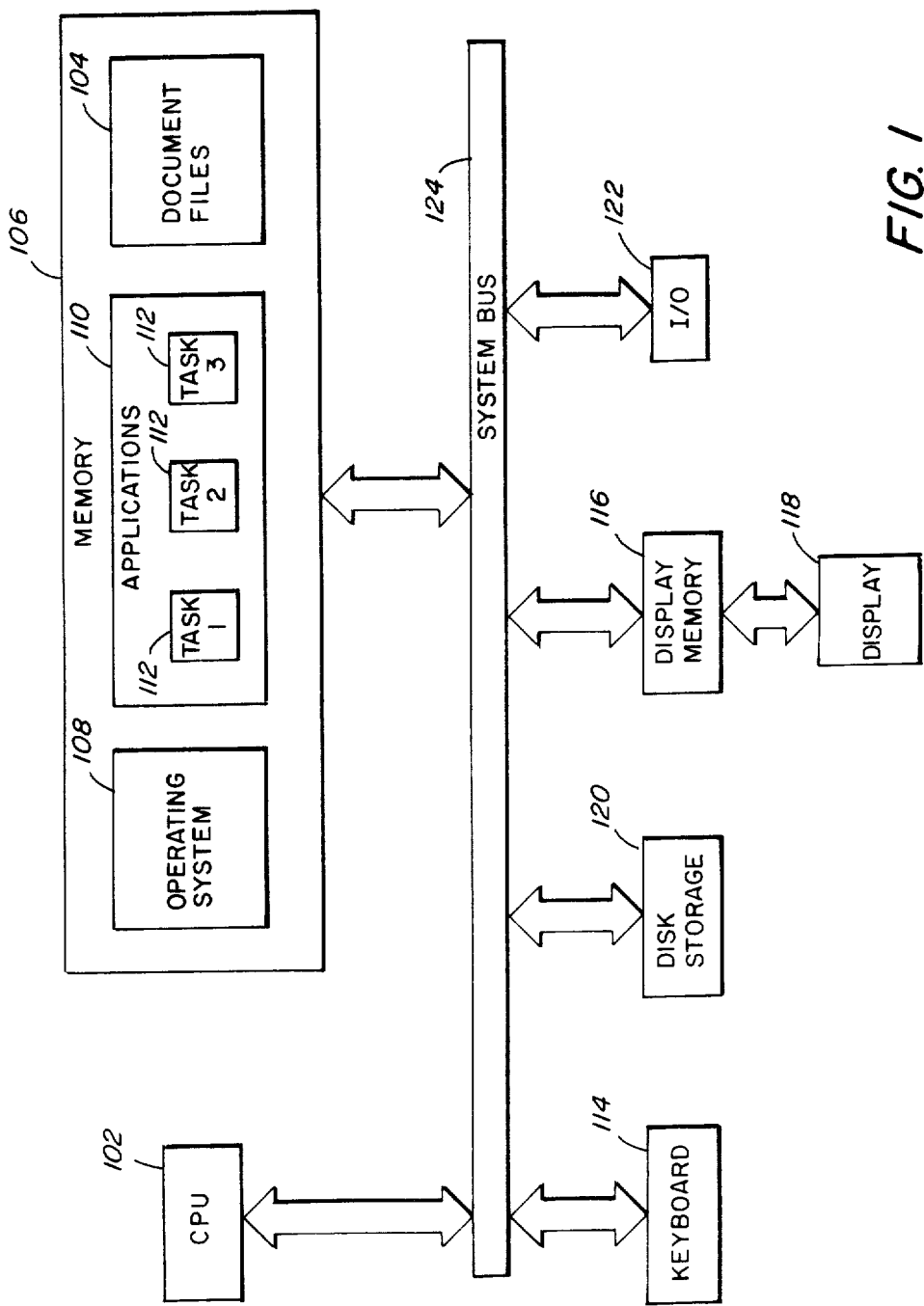
FIG. 1 is a block diagram of a system incorporating the present invention.

Referring to FIG. 1, a block diagram representation of a system incorporating the present invention is shown. The system, as described further below, is in the present embodiment a single user, multi-tasking system primarily dedicated to the performance of office functions, such as the generation, filing and printing of documents and other related office functions. As indicated therein, the system includes a Central Processing Unit (CPU) 102 for performing operations upon and related to Document Files (DFs) 104 residing in Memory 106. The operations of CPU 102, and other elements of the system, described below, are control by sequences of instructions, or routines, also residing in Memory 106. These routines are grouped into two broad classes, the first being Operating System (OS) routines 108 which direct the overall operations of the system and control certain commonly used or shared functions. The second group of routines are comprised of Applications 110, which are routines for controlling particular user operations upon the document files, for example, word processing and mailing list printings. As indicated in FIG. 1, Applications 110 reside in Memory 106 as one or more Tasks 112, wherein a Task 112 represents a series of operations to be performed by the system under control or direction of a user of the system.

Other elements of the system may include a Keyboard (KYBD) 114, through which a user enters instructions, commands and data to the system, and a Display Memory (DSPM) 116 and Display 118 through which the user is provided with visual representations of the system operations. Yet other elements may include a Disc Storage unit (Disc) 120 for storing, for example, document files and applications routines and an Input/Output device (I/O) 122 through which the system may communicate with other systems or devices. The elements of the system described above are interconnected and communicate through a System Bus 124.

Figure 2:
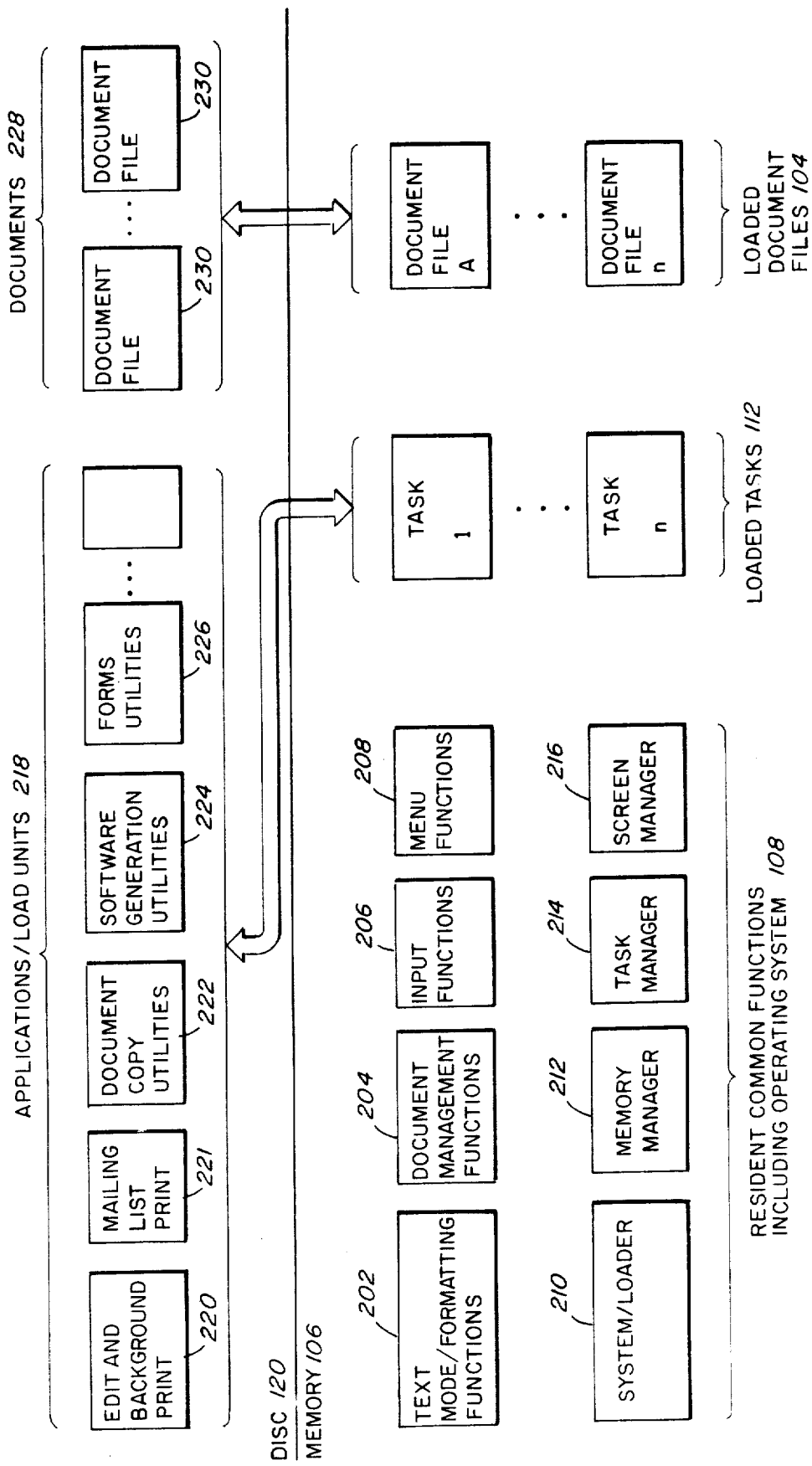
FIG. 2 is a diagrammic representation of the residence of control functions and data structures in the system of FIG. 1.

Referring to FIG. 2, a diagrammic representation of the physical residence of the Operating System (OS) 108 routines, Applications 110/Task 112 routines and Document Files 104 in the present system is shown. As described above, the controlling routines and data reside in the system memory space, which is comprised, as indicated in FIGS. 1 and 2, of Disc 120 and Memory 106.

Referring first to the OS 108 class of routines, these routines include both routines for directing the overall operation of the system and certain functions which are commonly used or shared by the various Tasks 112. In contrast to Applications 110/Tasks 112, these routines are, after system initialization, permanently resident in Memory 106. These common or shared functions, described in greater detail in the following descriptions, include, for example:

Text Mode/Formatting Functions 202 containing common text/document manipulation operations, Document Management Functions 204 which control access to Document Files 104, the communication of Document Files 104 between Disc 120 and Memory 106 and the creating, deleting, indexing. opening, closing, reading, writing, and updating of documents, Input Functions 206 which in part provide the interface between the user, through KYBD 114, and other functions controlling system operations, Menu Functions 208 which provides a menu type interface, displayed through Display 118, through which a user may select and control certain system operations and receive messages and prompts from the system.

System/Loader Function 210 which in part controls the loading of Applications 110/Tasks 112 into Memory 106 from Disc 120.

Memory Manager Functions 212 which control the allocation and use the the available space in Memory 106, Task Manager Functions 214 which control the sequence of execution of Tasks 112 in the system, and Screen Manager Functions 216 which control and direct the generation of displays appearing on Display 118.

It should be noted that, at least in certain embodiments or applications, certan or portions of certain of the above may not reside permanently in Memory 106. but may reside in Disc 120 and may be called from Disc 120 to Memory 106 for use by other functions or tasks as required.

Referring to the Applications 110/Task 112 class of routines, as indicated above Applications 110 are not permanently resident in Memory 106 but commonly reside in Disc 120 as Applications/Load Units 218. Applications/Load Units 218 are loaded into Memory 106 as required to perform user selected operations and, when so loaded, become Tasks 112. As indicated in FIG. 2, the system is a multi-tasking system and more than one Task 112 may be resident in Memory 106 and executing at a given time. Applications/Load Units 218 may include, for example:

Edit and Background Print 220, which are separate Applications 110/Tasks 112, contain the functionality necessary to perform, for example, document generation and word processing functions, including printing of the final result, Mailing List Print 222 which, as the name implies, performs mailing list operations, Document Copy Utilities 222 which performs document manipulation operations associated with the copying and moving of documents or portions thereof, Software Generation Utilities 224 which provides certain programming or software generation facilities to a system user, for example, the generation of fonts in which to print documents, and Forms Utilities 226, the operation of which is described in U.S. patent application No. 595,079, titled "Electronic Processing With Forms" and filed Mar. 3, 1984.

Referring finally to document residing in the present system, as indicated in FIG. 2 Documents 228 primarily reside in the system in Disc 120 as Document Files 230 in disc file format. Document files 230 to be operated upon by the system, or portions thereof, are loaded into Memory 106 and reside therein in a document structure format, described further below, as Document Files 104. Again, because the system is a multi-tasking system, more than one Document File 104 may reside in Memory 106 to be operated upon at any given time.

2. System Functional Structure and Operation (FIG. 3)

Figure 3:
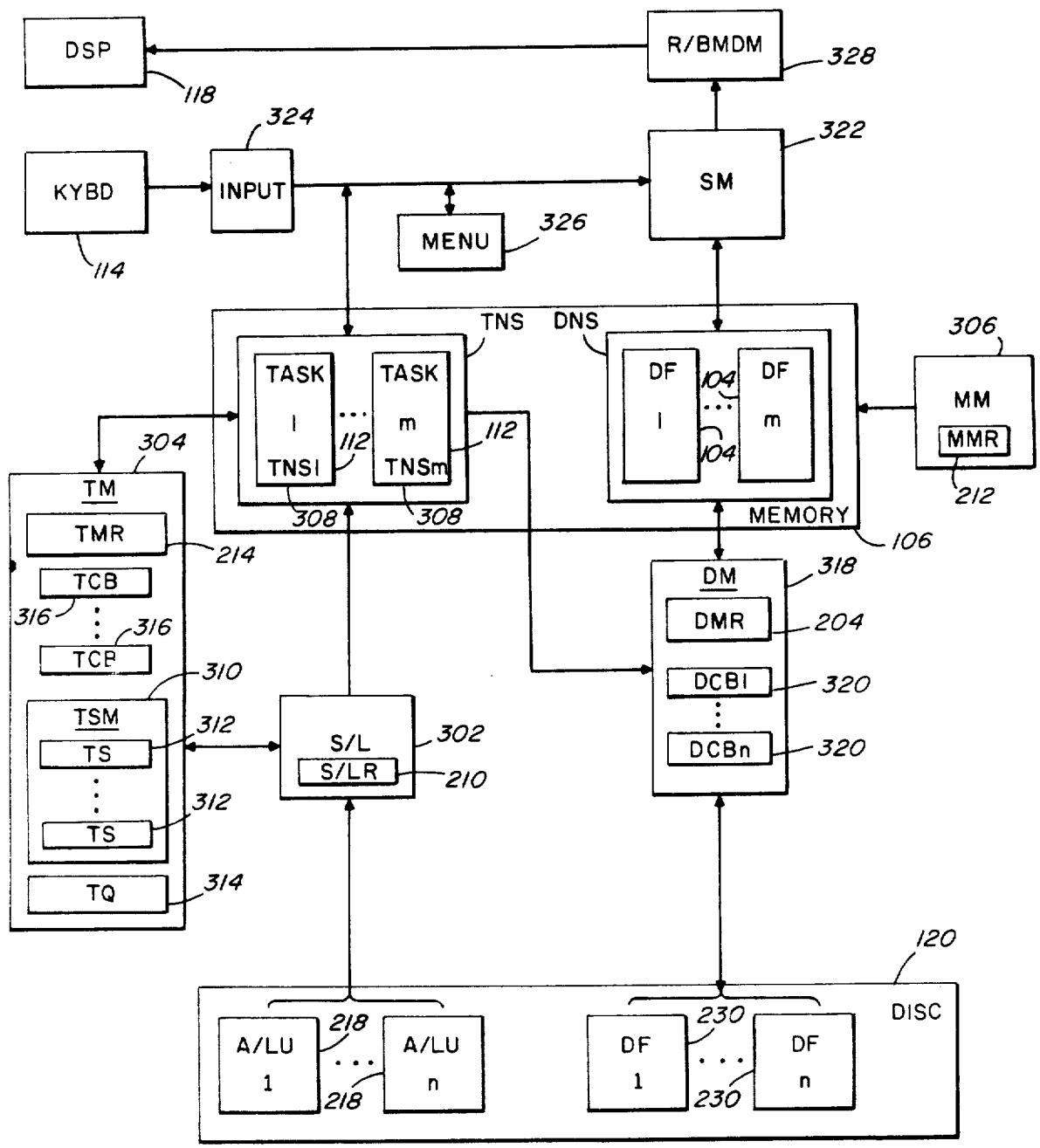
FIG. 3 is a diagrammic, functional representation of the operation of the control and data structures of the system of FIG. 1.

Referring to FIG. 3, a diagrammic representation of the functional structure and operation of the system is presented. Indicated therein is Disc 120 memory space containing one or more Application/Load Units (A/-LUs) 218 and one or more Document Files (DFs) 230 in disc file format. Also indicated is that portion of Memory 106 available for storing Tasks 112 and Document Files (DFs) 104 in document structure to be operated upon.

Considering first the functional elements for loading Tasks 112 into Memory 106 and for managing execution of Tasks 112, the system includes, as previously described, a System/Loader element (S/L) 302, a Task Manager element (TM) 304 and a Memory Manager element (MM) 306. S/L 302, which includes System/-Loader Routines (S/LR) 210, is the means by which A/LUs 218 are loaded into Memory 106 to become executable Tasks 112 and operates in conjunction with TM 304 and MM 306 in performing these operations. TM 304 and MM 306 include, respectively, the previously described Task Manager Routines (TMR) 214 and Memory Manager Routines (MMR) 212.

S/L 302 is responsive to either user requests, entered through KYBD 114, or requests resulting from the the operation of an already resident Task 112 to load A/LU 218s into Memory 106. In response to such request, and as described further below, S/L 302 responds to such requests by providing corresponding requests to MM 306 (not indicated in FIG. 3) to provide Task Node Spaces (TSNs) 308 to contain the new Tasks 112 and to TM 304 to create the control structures necessary to control execution of the newly loaded Tasks 112.

MM 306 responds to such requests from S/L 302 by providing such TSNs 308 while TM 304 responds by building the appropriate control structures. In this regard, it should be noted that TM 304, being the central management structure for a multi-tasking system, includes both a Task Stack Mechanism (TSM) 310 which contains a Task Stack (TS) 312 for each active Task 112 and a Task Queue (TQ) 314, which is used in determining the sequence of execution of the active Tasks 112. TM 304 also constructs, for each active Task 112, a Task Control Block (TCB) 316, described further below, which identifies and provides information pertinent to the execution of the associated Task 112.

The loading of DFs 230 or portions thereof into Memory 106 as DFs 104 to be operated upon, and access to such DFs 104 for such operations is performed and controlled through Document Manager element (DM) 318, which includes Document Manager Routines (DMR) 204. DM 318 interacts with MM 306 to obtain the necessary space in Memory 106 and constructs and maintains, for each DF 104, a control/data structure referred to as a Document Control Block (DCB) 320, described further below, which contains information pertinent to the associated DF 104. It should be noted that, in addition to controlling the transfer of DFs 104 between Memory 106 and Disc 120, and the associated transformations in file structure, all access to DFs 104 by Tasks 112 or other system routines is generally performed through DM 318 in the manner described further below, the exception, described below, being the access of DFs 104 by Screen Manager element (SM) 322.

Referring now to the system elements effectively comprising the interface between the user and system operations, these elements include, of course, KYBD 114 and DSP 118. User inputs through KYBD 114 are provided to Input element (Input) 324, which includes keystroke handling routines. Input 324 in turn provides outputs to Tasks 112, to effect the execution thereof, to Menu element (Menu) 326, and to SM 322. Considering first Menu 326, as previously described Menu 326 includes the routines necessary to create and provide a menu type interface, displayed through Display 118, through which a user may select and control certain system operations and receive messages and prompts from the system. As required by these functions, Menu 326 also provides outputs to SM 322 to be displayed through DSP 118.

SM 322, described in further detail below and in U.S. patent application No. 665,280, titled "Screen Manager For A Data Processing System and filed Sept 27, 1984, generates screen displays representing the operations of the system and presents such displays to the user through DSP 118 through Rasterizer/Bit Mapped Display Memory (R/BMDM) 328, which includes DSPM 116. As required by these functions, SM 322 requires access to the information contained in the document structures created as DFs 104 by DM 318, but does so through a SM 322 control structure, described in detail further below, rather than through DM 318 and DCBs 320. As also described further below, SM 322 is also provided with access to TM 304 maintained information regarding the status of certain currently active Tasks 112.

Having described the overall functional structure and operation of the system, certain elements and aspects of operation of the system will be described in further detail next below, beginning with the construction and execution of Tasks 112 and OS 108 routines.

3. Structure and Execution of Tasks 112 (FIG. 4)

Figure 4:
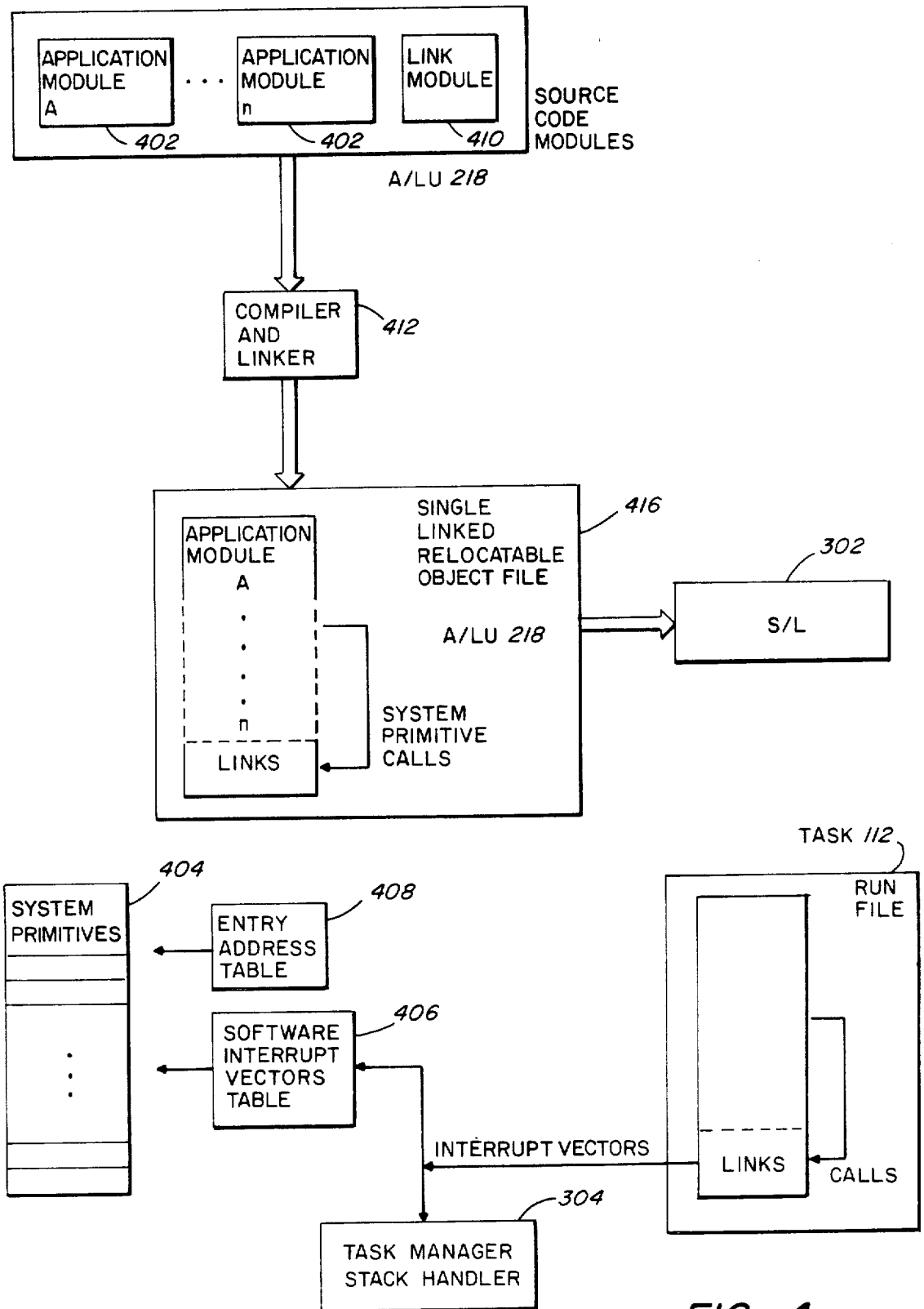
FIG. 4 is a diagrammic representation of the structure and operation of applications tasks in the system of FIG. 1.

Referring to FIG. 4, therein is represented the construction and execution of an A/LU 218. The initial structure of an A/LU 218, represented at the top of FIG. 4, is comprised of one or more source code Modules 402 created by a programmer and defining the operations to be preformed by the Task 112, for example, word processing. Represented in the lower portion of FIG. 4 are the routines comprising the OS 108 and common, shared routines, referred to as "System Primitives" 404, and certain system utility routines. These System Primitive Routines 404, some of which are described in further detail in following descriptions, may be called by an A/LU 218, as a Task 112, as required to perform the operations of the A/LU 218 and may include, for example:

Document Manager Routines 204,
Memory Management Routines 212,
Semaphore Management Routines (associated with Task Manager Routines 214),
Scheduling Routines (associated with Task Manager Routines 214),
Task Management Routines 214,
Timer Service Routines (associated with Task Manager Routines 214),
Screen Management Routines 216,
File Management Routines,
Direct Interrupt Control Routines,
File Access Routines,
Menu Routines 208, and
Device Control Routines.

In order to be able to create each A/LU 218 separately and to be able to load each A/LU 218 into the system dynamically, it is necessary to decouple all System Primitive Routines 404 and certain system functions, as described above, from the A/LUs 218. It is further preferable if, in doing so, the speed of execution of system primitive calls by the A/LUs 218 were enhanced. This is done, as shown in FIG. 4, by coding all System Primitive Routine 404 entry points as interrupt vectors through a Software Interrupt Vector Table 406 residing in a reserved area of Memory 106. Essentially, and as described below, all System Primitive Routine 404 calls by A/LUs 218, that is, by Tasks 112, are executed as software interrupt calls. As an initial step in such calls, the calling Task 112, operating through the stack handling facility of TM 304, pushes all necessary arguments onto its associated stack and, for some calls, puts its function code into a designated register.

In addition to the above A/LU 218/Task 112 calls, certain system functions, such as system start and application program terminate, are called through software interrupts to maintain software version independency. The system also provides, as indicated in FIG. 4, an Entry Address Table 408 for other entry to System Primitive Routines 404.

Considering now the construction of a A/LU 218/Task 112 performing System Primitive Routine 404 calls through a software interrupt mechanism, the initial source code applications Modules 402 have associated with them a Link Module 410 which defines the relationships between system primitive calls and the entries in Software Interrupt Vector Table 406. Upon compilation and linking of the original source code Modules and Link Module 410, through Compiler and Linker 412, the modules are transformed into a single, linked, relocatable object File 416 wherein the original system primitive calls are linked into the appropriate interrupt vectors taken from Link Module 410.

Object File 416 is an object code A/LU 218 and may be loaded into Memory 106 as a "run" file by S/L 302, as previously described, and all system primitive calls will, as described above, be executed as software interrupts by the Interrupt Vectors 418 resulting from such system primitive calls.

Having described the construction and structure of an A/LU 218 and Task 112, the loading of an A/LU 218 into the system to become a Task 112 will be described next below.

4. Loading of Tasks 112—Operation of System/Loader 302, Task Manager 304 and Memory Manager 306 (FIG. 5)

Figure 5:
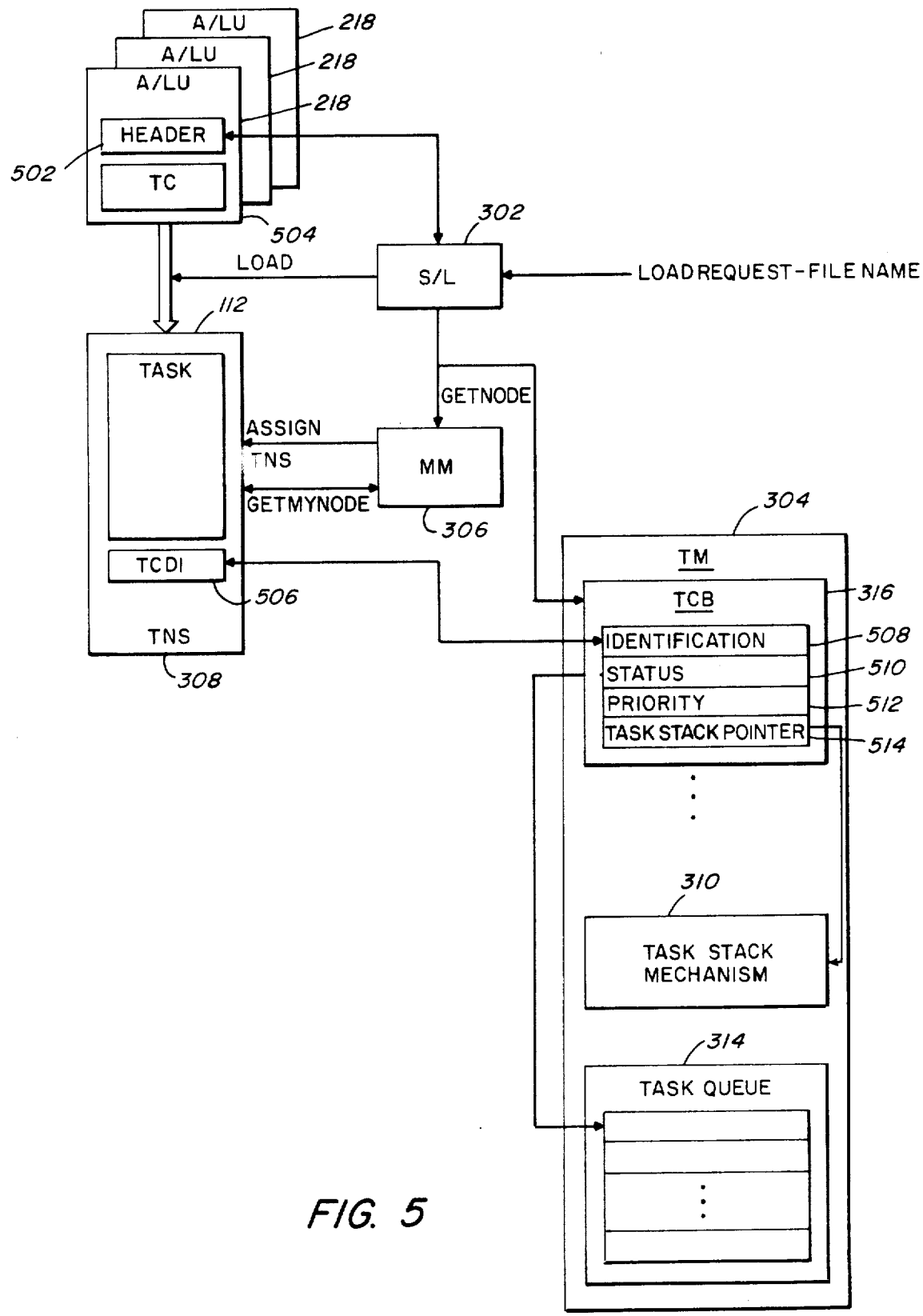
FIG. 5 is a diagrammic representation of the system loader and task manager of the system of FIG. 1.

Referring to FIG. 5, therein is represented the loading of an A/LU 218 into the system to become a Task 112, and the associated operations of S/L 302, TM 304 and MM 306. Shown therein are a plurality of A/LUs 218 resident in Disc 122, one of which is to be loaded into Memory 106 as a Task 112.

The loading of an A/LU 218 into Memory is initiated by a request for such an operation. Such requests may be initiated by a user through KYBD 114 and Input 324, or may be initiated by another active Task 112, and will include a file name identification of the requested A/LU 218. Such a request is provided to S/L 302, which identifies the corresponding A/LU 218 by means of a Header 502, containing identification information, associated with the A/LU 218 Task Code (TC) 504, or routines.

S/L 302 first generates a request to MM 306, by means of a MM 306 primitive (Getnode), for an area of Memory 106 to be assigned as the TNS 308 of the requested A/LU 218/Task 112. MM 306 will respond by assigning such a space and will identify the location of the TNS 308 to S/L 302. The TNS 308 associated with a given Task 112 is effectively that Task 112s memory space to be used as required in executing its operations.

S/L 302 then provides a request to TM 304 for TM 304 to construct the appropriate control structures for the requested A/LU 218. TM 304 responds by constructing a TCB 316, as described previously, and returning the TCB Identification (TCDI) 506 of the newly constructed TCB 316 associated with the requested A/LU 218.

S/L 302 then writes the A/LU 218 into the assigned TNS 308 and the assigned TCBI 506 into an assigned location within the TNS 308. The A/LU 218 thereby becomes an executable Task 112 by being assigned an active TNS 308 and by being linked into TM 304 by its associated TCBI 506, which is effectively an address, or ponter, to its associated TCB 316 in TM 304.

Referring now to TM 304 as shown in FIG. 5, as indicated therein each TCB 316 includes a unique Identification 508 identifying that particular TCB 316, Status 510 information describing the state of execution of the associated Task 112, Priority 512 information identifying the relative priority of the associated Task 112, and a Task Stack Pointer 514 identifying the location the the associated Task 112s stack in TM 304's TSM 310. Each TCB 316 associated with a Task 112 effectively resides in TM 304's Task Queue 314 wherein the TCBs 316 are linked, or chained, in order of task execution by a series of head pointers and a tail pointer. The order of execution is determined by task priority and status and TM 304 maintains a separate Task Queue 314 for each level of priority.

The above description has described the operation of MM 306 with regard to the initial assignment of a TNS 308 when a new A/LU 218 is loaded into the system to become a Task 112. It should be noted that, as described in further detail in following descriptions, MM 306 provides means for a Task 112 to request the assignment of further Memory 106 space to its TNS 308, specifically through the Getmynode primitive.

Further description regarding the structure and operation of TM 304 and MM 306 may be found in the attached appendices titled, respectively, "Appendix A—Task Manager" and "Appendix B—Memory Manager", incorporated herein by reference.

Having described above the structure of Tasks 112 and the loading of Tasks 112 into the system, the structure of DFs 104 upon which those tasks operate will be described next below, followed be a description of DM 318.

Figure 6:
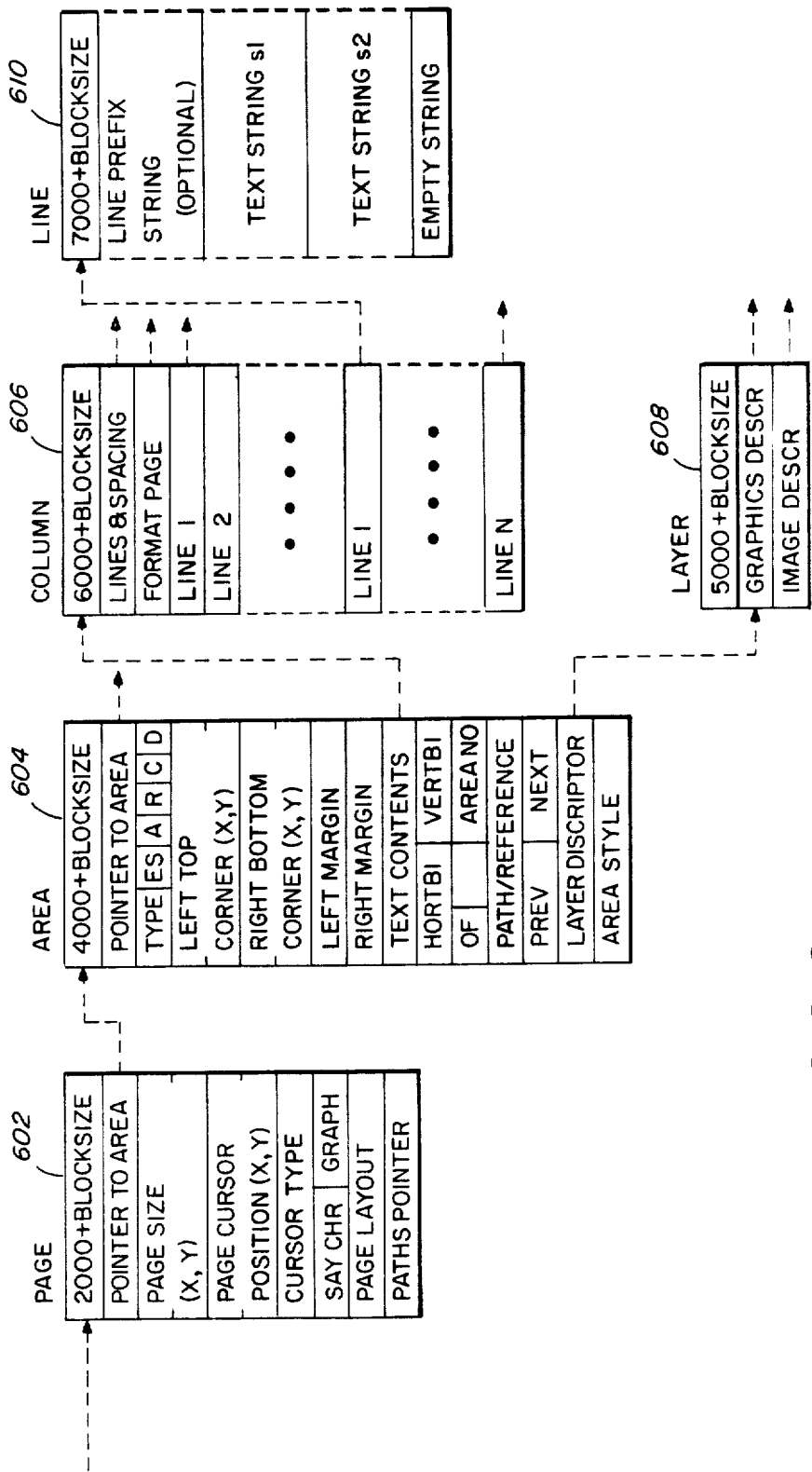
FIG. 6 is a diagrammic representation of the data structure of the system of FIG. 1.
Figure 7:
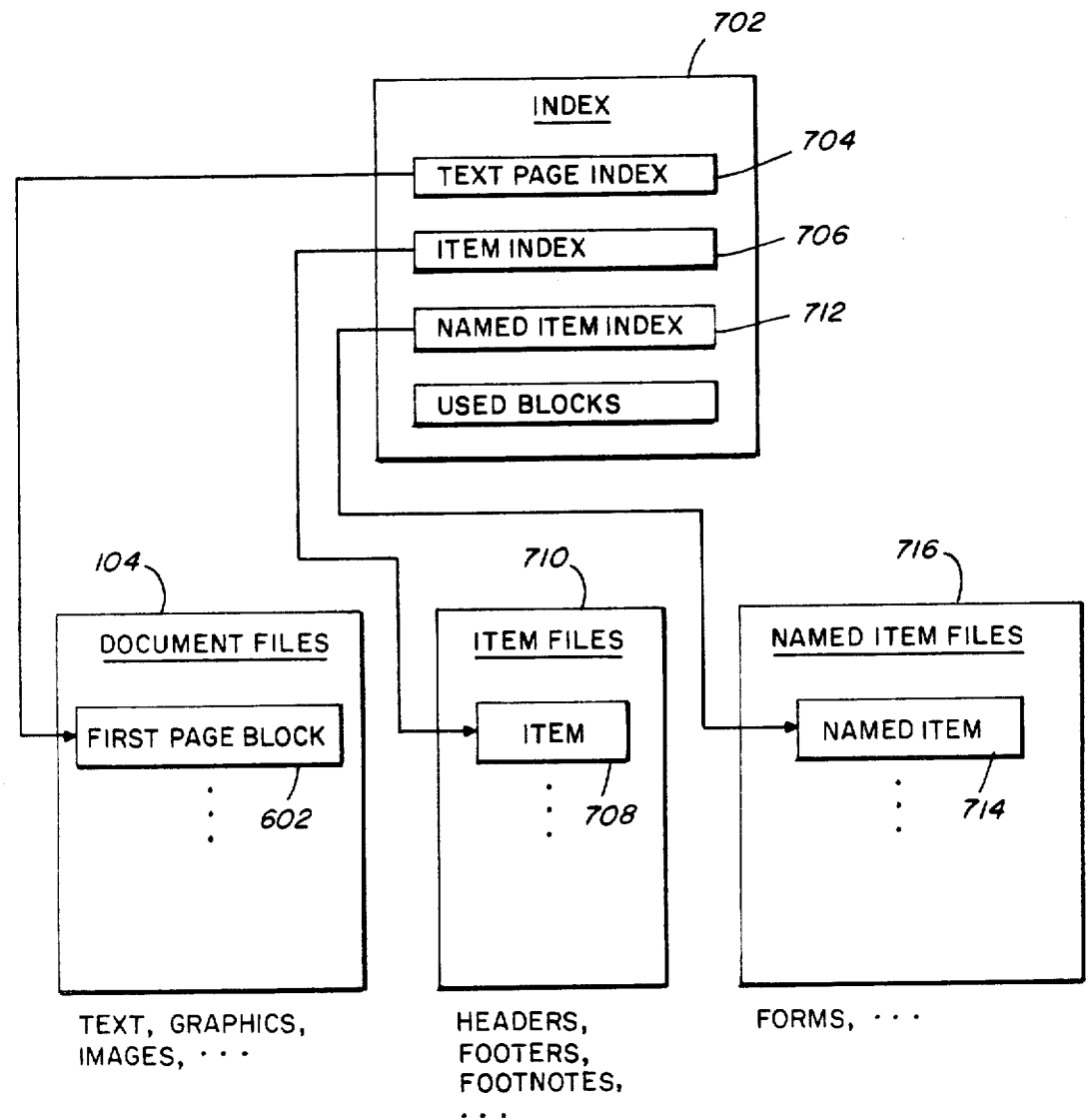
FIG. 7 is a diagrammic representation of the data file structure of the system of FIG. 1.

5. Document Files 104 Structure (FIGS. 6 and 7)

The structure of Document Files (DFs) 104 may be considered as comprised of two parts, the first being the actual document structure and the second being the file structure through which DM 318 accesses the document structure. These structures will thereby be described below, in that order and with reference to, respectively, FIGS. 6 and 7.

Before describing the document structure, the concept upon which the document structure is based must first be described. Essentially, the concept of the document structure is based upon that of an actual, physical document, which is comprised of one or more pages and wherein each such page may be regarded as comprised of one or more definable areas, each area containing a particular type of information. The information which may appear in such areas may include, for example, single column text, multiple column text, graphics, images, headers or footers, and footnotes.

A document file is comprised of a group of one or more Pages. wherein each Page is a rectangular, displayable object of general content comprised, for example, of text, graphic and image data. A Page may be a Menu, a Status line, a Prompt, or a Document Page. In this regard, a Page should not be confused with a Document Page, which is one form of a Page.

Each Page contains one or more Areas, an Area being a rectangular portion of a Page which is not subdivided and which may contain one or more Layers. A Layer, in turn, is a portion of the contents of an Area and contains a particular type of information, for example, text, graphics or images, and Layers may be superimposed to comprise the contents of an Area.

To aid in understanding the following descriptions of the operation of the present system, the following definitions are further provided. First, a Region is a rectangular portion of a Page which is further sub-divided. Finally, a Window is a rectangular portion of a Page which can be visible, for example to a user.

Referring now to FIG. 6, a partial illustration of a DF 104 data structure is shown; the data structure is further illustrated in "Appendix C—Document Data Structure". The first element of the structure is a Page Block 602 containing a pointer to the first Area of the Page, Page size information, Page Cursor information describing the location of a cursor in the Page. The cursor position information, among other functions, defines the location within the Page wherein current operations, for example, the insertion of text, will be performed. Also included is information as to cursor type. Save information, information as to whether the Page displays formatting, and information regarding Page layout. The Page block also contain Path Pointer information pointing to a Path Block which in turn defines, for example, whether the Page contains graphic or free text information and areas to receive overflow text.

The second element or elements of the data structure are one or more Area Blocks 604, each of which contains information pertaining to an associated Area of the Page. An Area Block 604 contains a pointer to the next Area Block 504, if there is more than one, information defining the type of Area, information identifying the locations of the top left and bottom right corners of the Area within the Page, and information regarding the right and left margins of the Area. A Text Contents pointer identifies the location of a Column Block 606, described below and identifying the location of text appearing in the Area, and a Layer Descriptor identifies the location of a Layer Block 608 described further below and identifying the location of graphics or image data appearing in the Area. Other fields of an Area Block 604 define the relationships between the edges of the Area and other Areas (ES), the path sequences to previous and next Areas of the Page ((Path/Reference, Prev., Next), style information pertaining to text in the Area (Area Style), and information pertaining to positional characteristics of text appearing in the Area (VERTB1, HORTB1).

The next elements, the Column Blocks contain information pertaining to text appearing in the Area. The first information, Lines & Spacing, defines the number of lines appearing in a column of text and the vertical spacing of the lines. The Format Page field contains a pointer to a block of format information defining the format of the associated column. The following fields, Line 1, Line 2, and so on, contain pointers to Line Blocks 610, each containing text appearing in the associated column and information pertaining to that text.

Referring to the example of a Line Block 610, the text appearing in a column is comprised of a series of text strings, each such string having common characteristics, or attributes, such as whether the characters are bold or italic or overscored or underscored. A Line Block 610 is comprised of a Line Prefix String containing information pertaining to the following text and one or more Text Strings containing the characters of the text. Each Text String is comprised of a String Header containing information regarding the characteristics or attributes of the associated string of text characters, and a string of text characters to which those attributes apply. A line may also contain a reference to an external information item which applies or is related to the Line, for example, headers, footers and footnotes, but may include other such items.

Referring finally to the Layer Blocks 60B, each Layer Block 608 contains a Graphics Descriptor or an Image Descriptor, each being a pointer to an associated body of graphics or image data appearing in the Area.

While the above description of the document structure has been sufficient as regards the following descriptions of operation of the system, further information regarding the document structure will be found in the appendix titled "Appendix C—Document Data Structure", incorporated herein by reference.

Having described the document data structures used in DFs 104, the Document File Structure through which DM 318 accesses DFs 104 will be described next below.

Referring to FIG. 7, the document file structure used by DM 318 included an Index Block 702 which includes a Text Page Index field 704 containing pointers identifying the locations of the Page Blocks 602 in the associated DF 104. As described above, a Page Block 602 of a DF 104 then contains the information necessary to locate the remaining information pertaining to that Page. The Index Block 702 further contains an Item Index field 706 identifying the locations of the Item File Blocks 708 in Item File 710.

The Item File Blocks 708 of Item File 710 may be chained together in the same manner as described above with reference to the document data structure and Item File 710 contains information pertaining to headers, footers and footnotes appearing in the document contained in the associated document structure. Index Block 702 further contains a Named Item Index Field 712 which contains pointers identifying the locations of the Named Item Blocks 714 in Named Item File 716. Named Item Blocks 714 in Named Item File 716 may again be chained together in the manner described above and essentially contain document data which is identified specifically by names, for example, forms containing blank spaces to be filled in as, for example, described in U.S. patent application Ser. No. 595,079, titled "Electronic Processing With Forms" and filed Mar. 3, 1984. Further description of the document file structure may be found in the appendix titled "Appendix D—File Management System", incorporated herein by reference.

Having described the document structure used to store document data in DFs 104, and the file structure utilized by DM 318, the operation of DM 318 will be described next below.

6. Document Manager 318, Structure and Operation (FIG. 8)

Figure 8:
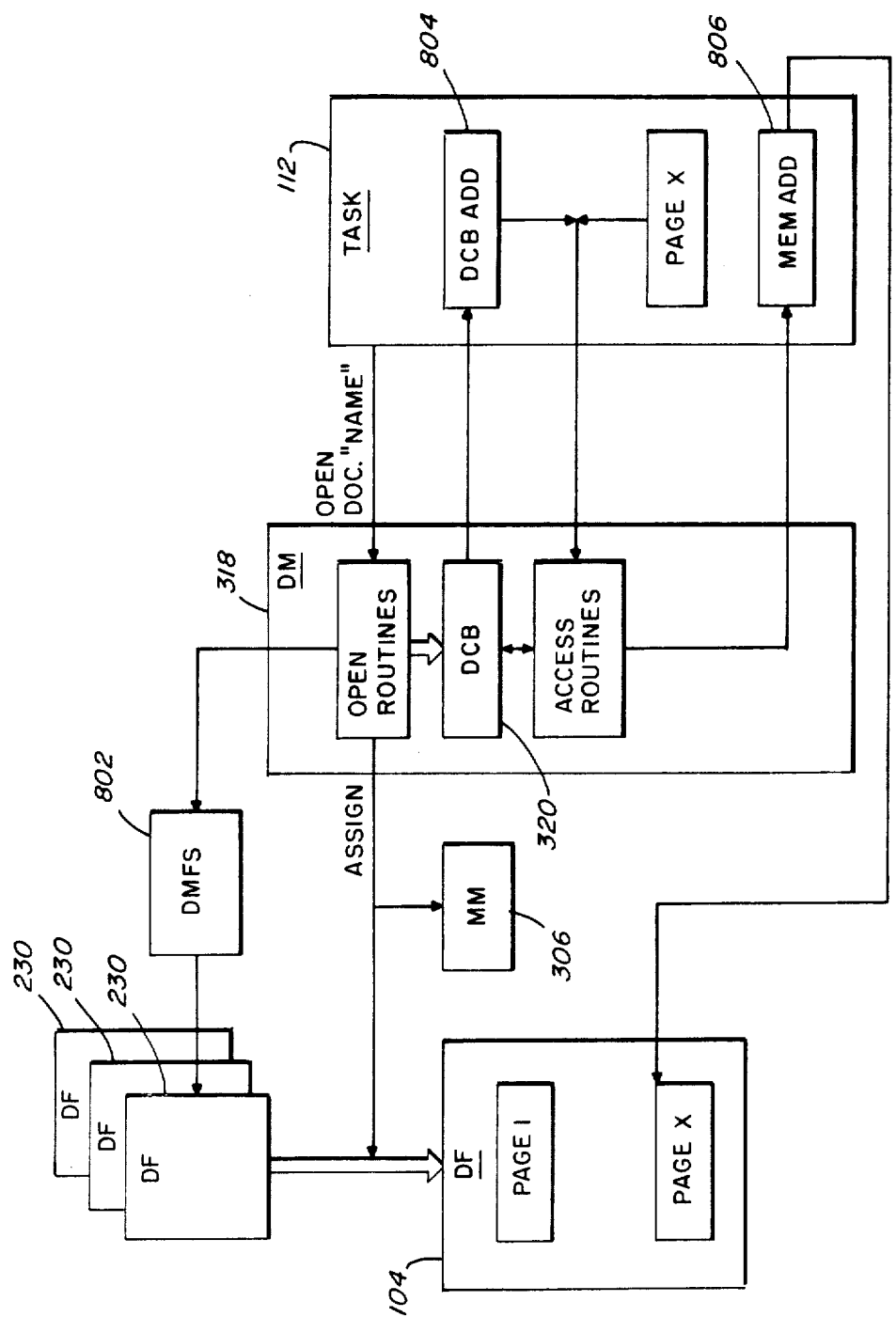
FIG. 8. is a diagrammic representation of the document manager of the system of FIG. 1.

Referring to FIG. 8, the operation of DM 318 is illustrated with respect to the loading, or opening, of a DF 104 and subsequent access to such a DF 104 by a Task 112. Further information regarding DM 318 may be found in the appendix titled "Appendix E—Document Manager" and is incorporated herein by reference.

As indicated in FIG. 8, a single DF 230 in disc file format is to be selected from a plurality of such DF 230s in Disc 120 and is to be read into Memory 106 as a DF 104 in document structure format for subsequent access by a Task 112. The loading of a DF 230 into Memory 106 may be initiated by means of a request issued by a Task 112, either as a result of a user command to do so or as a result of the operation of the Task 112. In the example illustrated in FIG. 8, the Task 112 desiring access to the document is shown as issuing the request. Such a request is essentially comprised of an open document request to the appropriate DM 318 OPEN routine, accompanied by the "Name", or file name, of the document requested.

DM 318 responds to such a request by locating the requested document in Disc 120 through the DM File Structure (DMFS) 802 and by issuing to MM 106 a request for the assignment of Memory 106 space in which to write the requested DF 104. MM 106 will respond in the manner described previously with reference to the operation of S/L 302 and the requested DF 230 will be assigned Memory 106 space in which to be written in document structure format as a DF 104. The requested DF 104 will then be actually written into Memory 106 is a separate, subsequent operation.

At this time, DM 318 generates a Document Control Block (DCB) 320 for and corresponding to the loaded DF 104 and writes the location of this corresponding DCB 320, as DCB Address (DCB ADD) 804, into an assigned location in the Task 112 requesting access to the document. As will be described further below, a DCB contains file information usable by DM 318 in maintaining the DF 104, information locating the document data within the DF 104 data structure, and information used by the Task 112 in operating upon the document data.

To obtain actual access to the document, for example, to operate upon the data contained therein, the Task 112 submits a request for such an operation to the DM 318 ACCESS routines. Such a request is comprised of an identification of the access or operation desired, the DCB ADD 804 of the DCB 320 corresponding to the DF 104, and the location within the document structure to which access is desired. Such location information takes the form of the identification of the Page containing the location, and the location within the Page. In the example presented in FIG. 8, the Task 112 has requested access to Page X of the DF 104. DM 318 then, using the access information contained in the corresponding DCB 320 and the document structure previously described with reference to FIG. 6, locates the location, or address, within Memory 106 of the requested Page X and returns this Memory Address (MEM ADD) 806 to a designated location in Task 122. Task 112 may then execute the desired operation.

Figure 9:
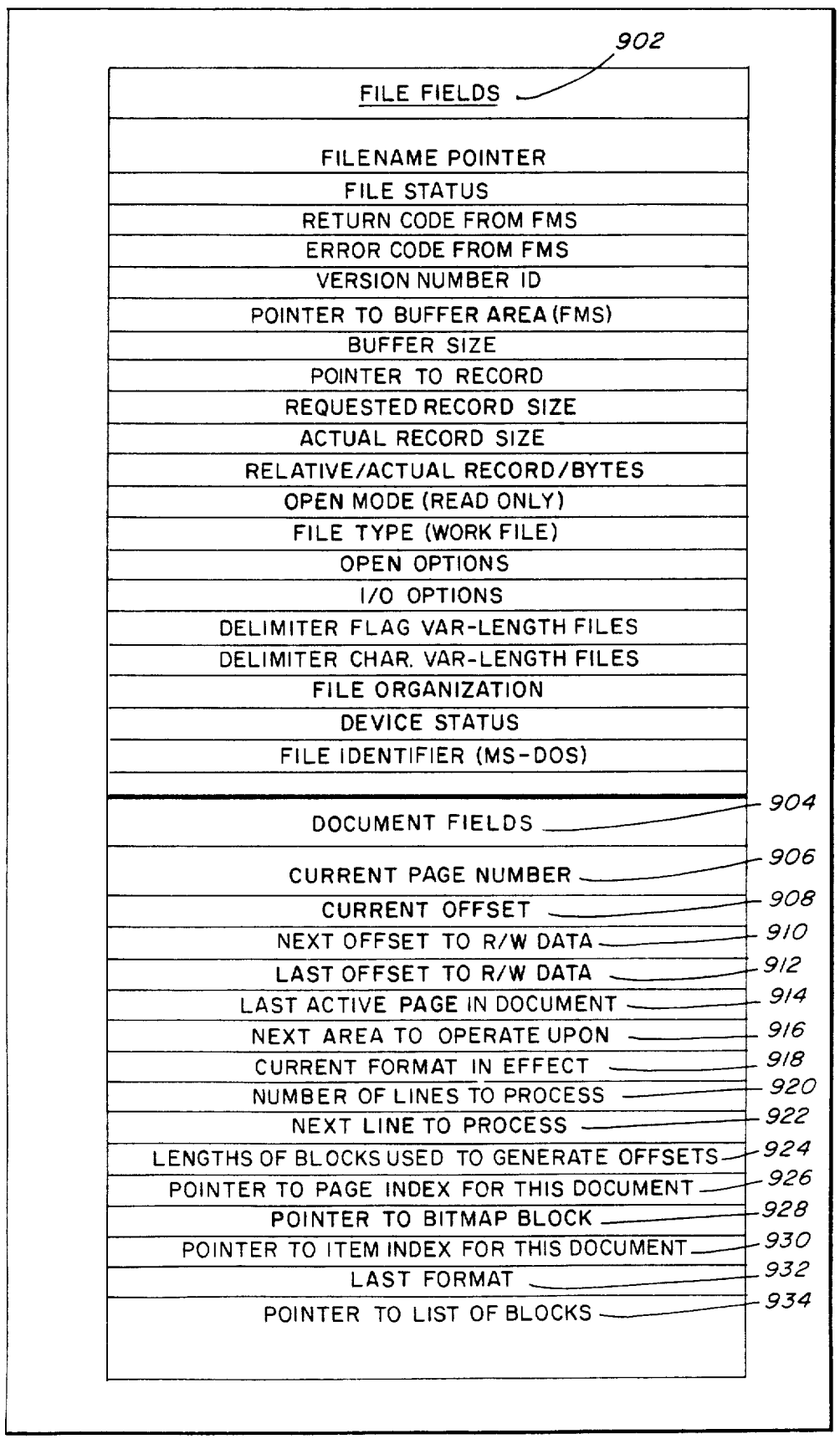
FIG. 9 is a diagrammic representation of a document control block generated by the document manager of the system of FIG. 1.

Referring to FIG. 9, therein is illustrated the structure of a DCB 320. As indicated therein, a DCB 320 is comprised to two major groups of information fields. The first, File Fields 902, is comprised of information used by DM 318 and DMFS 802 in maintaining the document record, or file, while the second group of fields, Document Fields 904, contains information used in accessing and operating upon the data contained in the DF 104 data structure.

The contents and functions of the various fields comprising File Fields 902 are described in detail in the appendix titled "Appendix D—File Management System" and, being incorporated herein by reference, will not be discussed further at this point. The contents and functions of the various fields comprising Document Fields 904 will be described further next below. During the following description, reference should be made to FIG. 6, illustrating the document data structure, and to Appendix C—Document Data Structure.

As described above, the various fields comprising Document Fields 904 contain information used, in part, in accessing and operating upon the document data contained in the document structure and, in part, link a Task 112 operating upon such data to the data in the document structure.

Referring to the Document Fields 904, Field 906 (Current Page Number) contains an identifier of the document Page currently being operated upon by a Task 112 while Field 908 (Current Offset) identifies the offset, or location, within that Page of the last operation executed by DM 318; this field may also indicated a current or next operation by DM 318.

Fields 910 and 912, respectively Next Offset To Read/Write Data, Last Offset to Read/Write Data, identify the locations of the previous and next Columns containing data which may be operated upon. Field 914 (Last Active Page) identifies the last Page in the document currently containing data, while Field 916 (Next Area To Operate Upon) identifies the next sequential Area containing data which may be operated upon. Field 918 (Current Format In Effect) identifies the format of the Column currently being operated upon while Field 932 (Last Format) identifies the format of the final Column of the document.

Field 920 (Number Of Lines To Process) indicates the number of Lines in the Column currently being operated upon while Field 922 (Next Line To Process) identifies the next of those Lines.

Field 924 (Lengths Of Blocks Used to Generate Offsets) identifies the lengths of the Blocks in the document. Field 926 (Pointer To Page Index For This Document) contains a pointer to the Text Page Index 704 of the Document File Structure (see FIG. 7). Field 930 (Pointer To Item Index For This Document) is similar to Field 928 but contains a pointer to Item Index 706.

Finally, Field 928 (Pointer to Bitmap Block) contains a pointer to the Document File Structure field indicated the used/un-used Blocks in the document while Field 934 (Pointer to List of Blocks) similarly contains a pointer to a list of the Blocks in the document.

Having described the overall operation of DM 318 and the document structure and DCBs 318 associated with DM 318, the structure and operation of Screen Manager (SM) 322 will be described next below.

Figure 12:
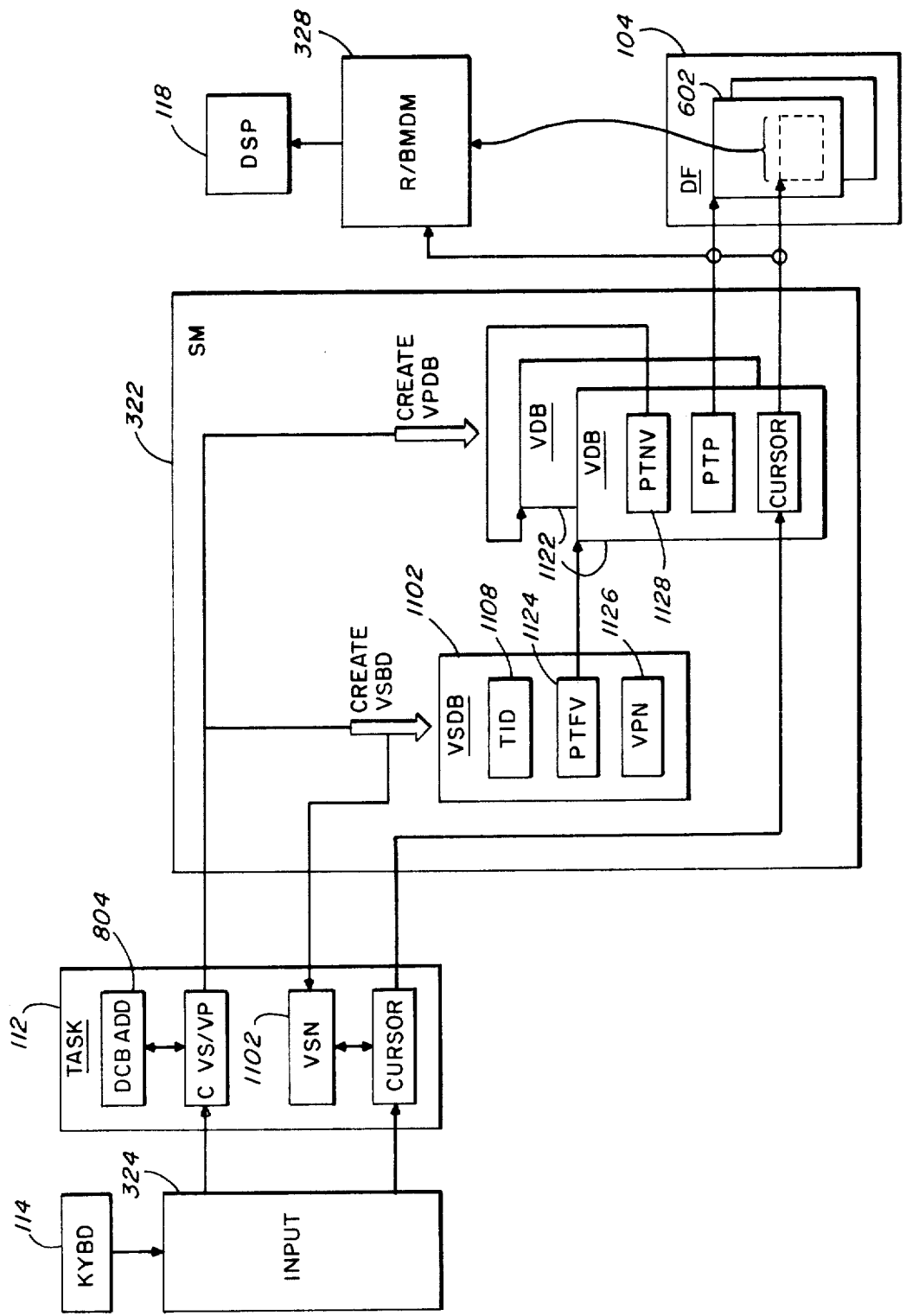

7. Screen Manager 322, Structure and Operation (FIGS. 10, 11 and 12)

As previously described, SM 322 operates with R/BMDM 328, under control of Tasks 112 or user command through Input 324, to generate visual displays representing system operations or information, the resulting displays being presented to the user through DSP 118. SM 322 defines the information to be displayed, extracts the information from DFs 104 or TM 304, and provides the information to be displayed to R/BMDM 328. In this regard, it should be noted that, as previously described and as described further below, SM 322 is the only system element which is not required to access DFs 104 through DM 318, although SM 322 utilizes the document structures constructed by DM 318 to access document data for display.

R/BMDM 32B is comprised of a rasterizer and a bit mapped display memory. The rasterizer portion of R/BMDM 328 receives information to be displayed from SM 322, rasterizes the information into bit mapped form, and stores the resulting bit mapped display information in the bit mapped memory portion of R/BMDM 328. The display information is then read from the bit mapped display memory and displayed to the user through DSP 118.

As previously described, the present system is a multi-tasking system, that is, can execute one task which interacts with the user in the foreground mode while executing one or more tasks not requiring such interaction in the background mode. As described in associated U.S. patent application Ser. No. 655,280, titled "Screen Manager For A Data Processing System " and filed Sept. 27, 1984, the display provided by SM 322 reflects this system operation in the manner in which it generates a "windowed"display. That is, the screen display is divided into various windows, or areas, each window displaying information regarding a an associated aspect of system operation. As described below, the location, size and information content of each such window is dependent upon the associated aspect of system operation to be displayed therein.

A typical display on the physical display screen of DSP 118 is illustrated in FIG. 10A. A display from the foreground task is provided on a major portion of the physical display screen indicated as the Task Screen 1002. Under control of the operating system to be described below, the display on the task screen may be divided into a number of display Viewports 1004, each of which independently displays a different set of information. Viewports 1004 are shown separated by broken lines but such lines need not actually be displayed. As examples, on the display of FIG. 10A Viewports 1004 are provided to display the document name, prompts, word processing page format, text, graphics, a user menu, and error messages. Of course. many other types of information can be displayed in different Viewports 1004 and all of the Viewports 1004 shown in FIG. 10A need not be displayed at any one time.

The viewport technique gives each application task great flexibility in designating the data to be displayed. That flexibility is obtained with little added complication to the application task software because, once established by the application task, it is controlled by SM 322. Once the Viewports 1004 have been established, the application software need only be concerned with completing the task and modifying the data to be displayed as required by the task. As noted above, only the Task 112 with which the user is interacting at any time is permitted to control a display on the physical screen. Although background tasks are not permitted to control DSP 118, SM 322 establishes virtual screens corresponding to background applications.

Those virtual screens can be considered, as shown in FIG. 10B, to be the logical equivalent of a stack of pages including Virtual Screens 1006 VS1, VS2, VS3 and VS4. Only one of those Virtual Screens 1006 is displayed on the physical screen, that is, as Task Screen 1002. The other Virtual Screens 1006 are held by SM 322 for display when called by the operator.

In order that the system user can always be aware of the status of the Tasks 112 associated with Virtual Screens 1006 which are not displayed, SM 322 provides Virtual Screen Identifiers 1008 in a Virtual Screen portion 1010. Each Identifier 1008 may name the associated Virtual Screen 1006, or Task 112, and may also provide an indication as to the status of the associated Task 112. The SM 318 Virtual Screen portion 1010 may also include a calendar and clock display.

The present system further offers windowing at two levels. The first is at the the task level wherein a Virtual Screen 1006 may be associated with a Task 112 and the Virtual Screen 1006 associated with the current foreground Task 112 associated with Task Screen 1002. SM 322 may create as many Virtual Screens 1006 as desired by the system user and may associated more than one Virtual Screen 1006 with a particular Task 112.

The second level is within the task level, whereby a particular application Task 112 can subdivide its' associated Virtual Screen 1006 into viewport windows, each displaying different information regarding that particular Task 112. Essentially, a Virtual Screen 1006 may be regarded as the visual display for its' associated Task 112 and each viewport defined therein may be regarded as a logical display window looking onto a designated area of the document being operated upon the that Task 112. In this regard, a Virtual Screen 1006 will contain at least one viewport, and may contain as many viewports as desired by the system user. Each viewport within a Virtual Screen 1006 may be individually defined as regards viewport size and position within the document and, in general, all viewports defined in a Virtual Screen 1006 will appear side by side in Task Screen 1002 whenever the associated Task 112 become the foreground task.

Referring now to FIG. 11, therein is represented the screen manager control structure through which SM 322 accesses document data contained in the document structures constructed by DM 318 and previously described with reference to FIGS. 6, 7 and 9. As indicated therein, DM 322, as described further below, constructs a Virtual Screen Descriptor Block (VSDB) 1102 for each active Task 112, the VSDB 1102 acting, for each such Task 112, to link SM 322 to both the associated Task 112 and the DF 104 being operated upon by the Task 112. It should be noted that, in the case of a Task 112 operating upon multiple DFs 104, SM 322 will construct a VSDB 1102, and associated viewport descriptor blocks, described below, for each DF 104 being operated upon by the Task 112 with the Task 112 and SM 322 being linked to each such DF 104 through the associated VSDBs 1102.

As shown in FIG. 11, each VSDB 1102 includes a Screen Identifier (SID) field 1104 identifying the particular Virtual Screen 1006, a Virtual Screen Name (VSN) field 1106 containing a name identification of the corresponding Virtual Screen 1006, and a Task Identifier (TID) field 1108 identifying the Task 112 associated with the corresponding Virtual Screen 1006. Pointer To Next Virtual Screen (PNVS) field 1110 contains a pointer to the next VSDB 1102, thereby chaining together all currently active Virtual Screen 1006 descriptor blocks for access by SM 322.

Screen Width (SW) 1112, Screen Height (SH) 1114, Top Left Horizontal Position (TLHP) 1116, and Top Left Vertical Position (TLVP) 1118 fields respectively define the width, height, and position of the corresponding Virtual Screen 1006 with respect to Task Screen 1002, that is, with respect to the appearance of the Virtual Screen 1006 on DSP 118. Virtual Screen Active Data (VSAD) field 1120 identifies that portion of the associated Virtual Screen 1006 which is presently being operated upon by the associated Task 112.

As previously described, at least one, and possibly several viewports will be associated with each Active Screen 1006. Each such viewport associated with a Virtual Screen 1006 will have associated with it a Viewport Descriptor Block (VDB) 1120, the VDB 1120 in turn being associated with the Virtual Screen 1006's VSDB 1102. As shown in FIG. 11, the VSDB 1102 of a Virtual Screen 1006 contains a Pointer to First Viewport field 1124, which contain a pointer to the VDB 1122 of the first viewport associated with that Virtual Screen 1006. The VSDB 1102 also contains an Array Of Allocated Viewport Numbers field (AAVN) 1126, which contains entries identifying the viewports associated with the corresponding Virtual Screen 1006.

Referring now to the structure of a VDB 1122, each VDB 1122 contains a Pointer To Next Viewport field 1128 which identifies the location of the next viewport associated with the corresponding Virtual Screen 1006, thereby chaining together the VDB 1122's associated with a particular Virtual Screen 1006 for location by SM 322. The VDB 1122 further includes a Pointer To Page (PTP) field 1130 which identifies the location of the Page upon which the associated viewport is logically positioned. The Pointer to Page field 1130 pointer points to the first Page Block 602 of that Page, as previously described with reference to FIG. 6.

The VDB 1122 further contains Top Left Horizontal Position (TLHP) 1132, Top Left Vertical Position (TLVP) 1134, Viewport Width (VW) 1136 and Viewport Height (VH) 1138 fields describing the relative position and dimensions of the viewport in the associated Virtual Screen 11006.

The VDB also contains a Horizontal Positon Of Viewport Relative To Page (HPVRP) field 1140 and a Vertical Position Of Viewport Relative to Page (VPVRP) field 1142 which describe the relative logical position of the associated viewport upon the Page identified by Pointer To Page field 1130. The information contained in the HPVRP 1140 and VPVRP 1142 fields, together with the information contained in the PTP field 1130, may be used by SM 322 to identify and locate the logical position, relative to the data contained therein, of the viewport within the DF 104 data structure being operated upon by the associated Task 112. These fields, in further conjunction with the information contained in VW field 1136 and VH field 1138, then allow SM 322 to located and identify the data logically contained within the associated viewport. SM 322 may thereby read the data so identified to R/BMDM 328 to be displayed in that area of Task Screen 1002 identified by the information contained in TLHP field 1132, TLVP field 1134, VW field 1136 and VH field 1138. In addition to the above fields, VDB 1122 includes Cursor Type (CT) field 1144, Horizontal Position Of Cursor On Page (HPCP) field 1146, and Vertical Position Of Cursor On Page (HPCP) field 1148. As previously described with reference to the Cursor Type field of a Page Block 602, CT field 1144 contains information regarding an operation to be performed at the cursor location or the type of data or information involved or being operated upon.

HPCP field 1146 and VPCP field 1148 describe the position of a cursor associated with the corresponding viewport and located in the associated Page and within the viewport area in that Page. This cursor is initially located in the upper left corner of the viewport, at the position defined by TLHP field 1132 and TLVP field 1134, and is moved about within the viewport as the associated Task 112 performs operations upon that portion of the data structure corresponding to the viewport area. The cursor essentially defines the location of the data currently being operated upon by the associated Task 112.

As described further below, in addition to identifying the location of data to be operated upon within the associated DF 104, the position of the cursor as defined by HPCP field 1146 and VPCP field 1148 is monitored with regard to the position and area of the viewport as defined by the other fields of the VCB 1122. If the Task 112 operations related to the cursor move outside of the viewport area defined by the VDB 1122 fields, the position of the viewport is moved accordingly by by SM 322 by writing new viewport position information into the appropriate VDB 1122 fields. The viewport associated with a Task 112 thereby remains logically located over the DF 104 data area in which the Task 112 is operating.

Finally, it should be noted that VDB 1122 contains a Viewport Flag field 1150 containing flags describing the viewport to SM 322 and used by SM 322 in maintaining the viewport.

Having described the SM 322 structure through which SM 322 accesses data contained in DFs 104, the overall operation of SM 322 will be described next below with reference to FIG. 12.

As previously described, the creation of a Virtual Screen 1006 or a viewport within an existng Virtual Screen 1006 is generally initiated by a Task 112 in response to a user request, which may be entered by means of input through KYBD 114 and Input 324. The Task 112 will respond by providing the appropriate request for the creation of a virtual screen or viewport (C VS/VP) to SM 322, the request including the identity of the requesting Task 112, the DCB ADD 804 referring to the DCB 320 of the DF 104 in which the virtual window or viewport is to appear, and information defining the virtual screen or viewport.

SM 322 will respond to such a request by creating the appropriate VSDB 1102 and a first VDB 1122, or if the request is for an additional viewport, by creating the appropriate VDB 1122. Considering the first, more general case, SM322 writes a Task Identifier into TED field 1108, providing a link back to the requesting Task 112, and a Pointer to First Viewport into PTFV field 1124 to link the VSDB 1102 to the associated VDB 1122. At this time, SM 322 writes a viewport number corresponding to the newly created viewport into AAVN field 1126. A previously described, this field is used by SM 322 in maintaining and administering the allocated viewports. Then, after creating the remaining VSDB 1102 fields, SM 322 writes a Virtual Screen Number 1202 back into a designated location in the Task 112 Task Node Space 308 to be used by the Task 112 in identifying the associated VSDB 1102.

SM 322 will then, if the request was either for a new virtual screen or for new viewport within an existing virtual screen, create a VDB 1122 as described above. If the request was for a new virtual screen, the VDB 1122 will be the first VDB 1122 and is thereby pointed to by PTFV 1124. If the request was for an additional viewport, the new VDB 1122 will chained into the already existing chain of VDB 1122's by means of a pointer written into the PTNV field 1120 of the last previously existing VDB 1122.

It should be noted that, in the creation of the DVB 1122, the DCB ADD provided with the initial request is used to create the Pointer to Page field 1130 entry in the DVB 1122. The cursor type and position fields of the DVB 1122 are similarly created at this time.

Having created the necessary access structure, SM 322 will subsequently use the VSDB 1102 and associated VDBs 1122 to obtain and provide information to be displayed to R/BMDM 328 and DSP 118 whenever the associated Task 112 becomes the current foreground task.

It should be noted that further information regarding the structure and operation of SM 322 may be found in the appendix titled "Appendix F—Screen Manager", incorporated herein by reference.

It should also be noted that further description of elements of the system not described in detail above may be found in yet further attached appendices. For example, a description of Menu 326 and Text Mode/Formatting Functions 202 may be found in appendices title "Appendix G—Menu" and "Appendix H—Text Mode/Formatting", incorporated herein by reference.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than be the foregoing description, and all changes which come within the meaning and range of equivalency of the claims are intended to be embraced therein.

What is claimed is:

1. In a document processing system including a memory means operable for storing therein data representative of information appearing in a document and a CPU means coupled to the memory means for storing and retrieving the document data therein, the CPU means further being operable for storing within the memory means and for processing therein data representative of information appearing in the document, a method of storing within and retrieving from the memory means data representing information appearing in a document, comprising the steps of:

for each document, storing within the memory means data representing a page block for defining at least one page, for each page, storing within the memory means data representing an area block for subdividing the page into one or more contiguous and nonoverlapping areas, wherein each area contains at least one type of information, in an area containing text information, storing within the memory means data representing a column block for defining at least one column for containing text information, for each column, storing within the memory means data representing a line block for defining at least one line, and for each line, storing a string of at least one text character, storing within the memory means data representing information for defining attributes applying to the characters of the string, and storing within the memory means data representing information for defining external data items associated with the line.

2. The data storing and retrieving method of claim 1, further comprising the steps of:

in an area containing graphics information, storing within the memory means data representing information for defining a graphics layer, for each layer, storing within the memory means data representing information for defining a linked group of graphics descriptors, and for each graphic descriptor, storing within the memory means data representing information for defining a description of a graphics element appearing in the corresponding area.

3. The data storing and retrieving method of claim 1, further comprising the steps of:

in an area containing image information, storing within the memory means data representing information for defining an image layer, and for each layer, storing within the memory means data representing information for defining the location in memory of a bit mapped representation of an image appearing in the corresponding area.

4. A data structure for use in an interactive document processing system, the data structure being expressive of information conveyed by a document, the system having a document entry means, a document display means, and a processing means operably coupled to the document entry and display means for interactively creating, processing and displaying a document, the processing means further being operatively coupled to a memory means for storing the data structure therein, the data structure comprising:

data defining one or more page blocks, each of said page blocks containing page descriptor information for defining page related data, each of said page blocks comprising one or more area blocks, each of the area blocks defining an area of the page which is disposed in a contiguous and nonoverlapping manner to other areas of the page, each of said area blocks having at least one type of document information, each of said area blocks comprising data defining one or more types of layers, each of said types of layers having a different type of document information, the document information of each of said types of layers being capable of being simultaneously expressed to provide an area block having one or more different types of document information.

5. The data structure of claim 4 wherein said page descriptor information comprises:

fields describing the logical dimensions of the page;

fields describing the position of a cursor on the page;

a field describing the type of cursor;

a field describing the layout of the page, the layout being descriptive of at least how many of said area blocks comprise the page; and a field describing the location in memory of one of said area blocks.

6. The data structure of claim 4 wherein said area block further comprises:

a field for containing a pointer to a next area;

fields containing information defining the type of area;

fields defining the logical position of the area within said page;

fields defining the margins of the area;

fields defining the position of the text appearing in the area;

fields defining the positional relationship of the area to other areas comprising the page; and a field containing a pointer to a column block.

7. The data structure of claim 6 wherein said column block comprises:

a field identifying the format of text appearing in the area; and at least one field containing a pointer to a line block.

8. The data structure of claim 7 wherein said line block comprises:

at least one field containing a string having at least one text character;

data defining attributes applying to the characters of the string; and data defining external data items associated with the line.

9. The data structure of claim 4 wherein one of said types of layers is a text layer comprising:

data defining at least one column for containing text information, each column comprising at least one line, each line comprising data defining a string of at least one text character;

data defining a reference to attributes applying to the characters of the string; and data defining reference to external data items associated with the line.

10. The data structure of claim 4 wherein one of said types of layers is a graphics layer comprising data defining a linked group of graphics descriptors, each of said graphics descriptors defining a pointer to a graphics element appearing in the corresponding area.

11. The data structure of claim 4 wherein one of said types of layers is an image layer comprising data defining a pointer to a bit mapped representation of an image appearing in the corresponding area.

12. The data structure of claim 4 further comprising:

an index structure comprising fields containing pointers to other page blocks associated with the document;

fields containing pointers to one or more first item files associated with the document; and fields containing pointers to one or more second item files associated with said document, one of said second item files being referenced by a name associated with said second item file.

* * * * *